Figure 1A:
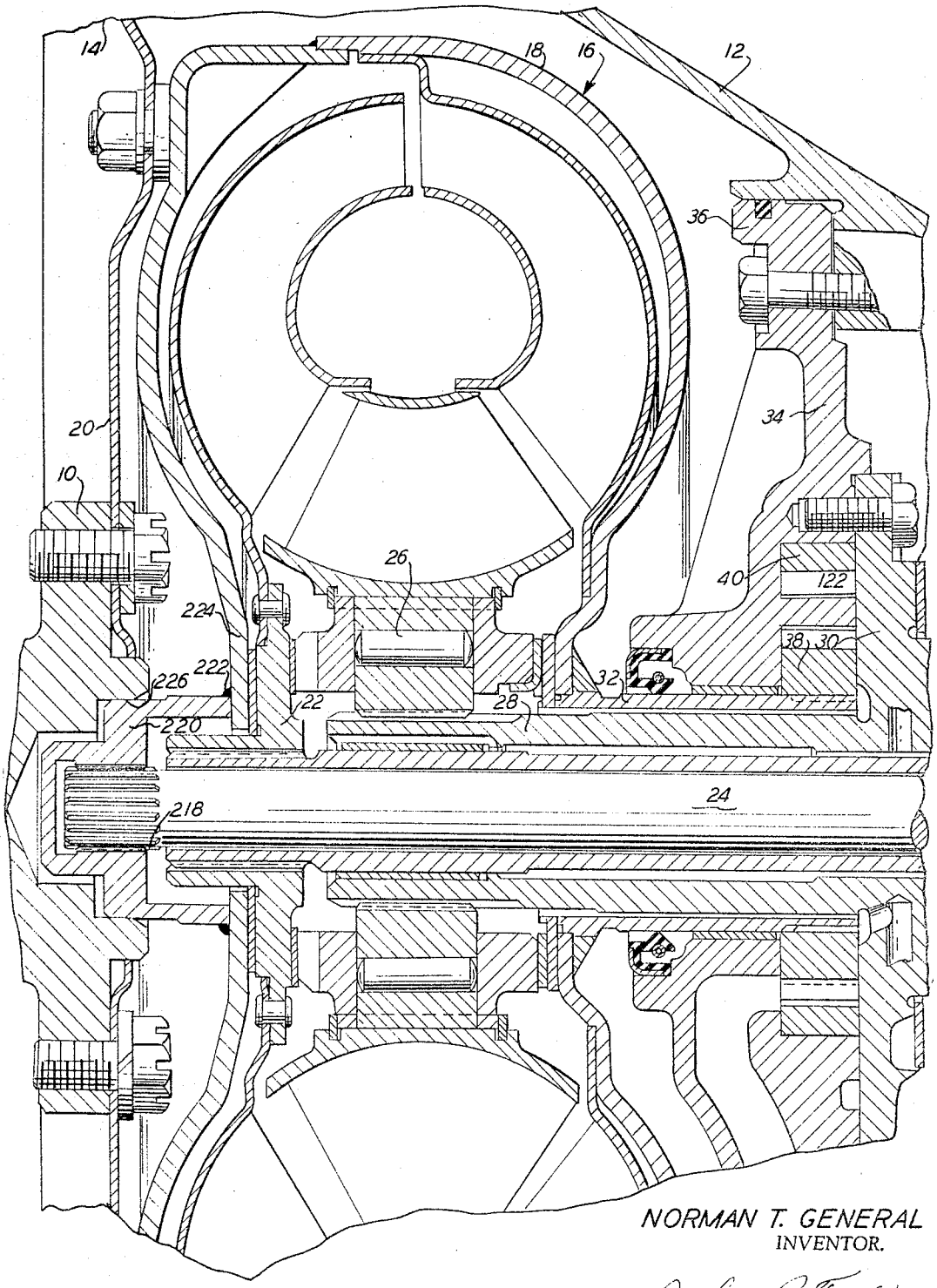
Figure 1B:
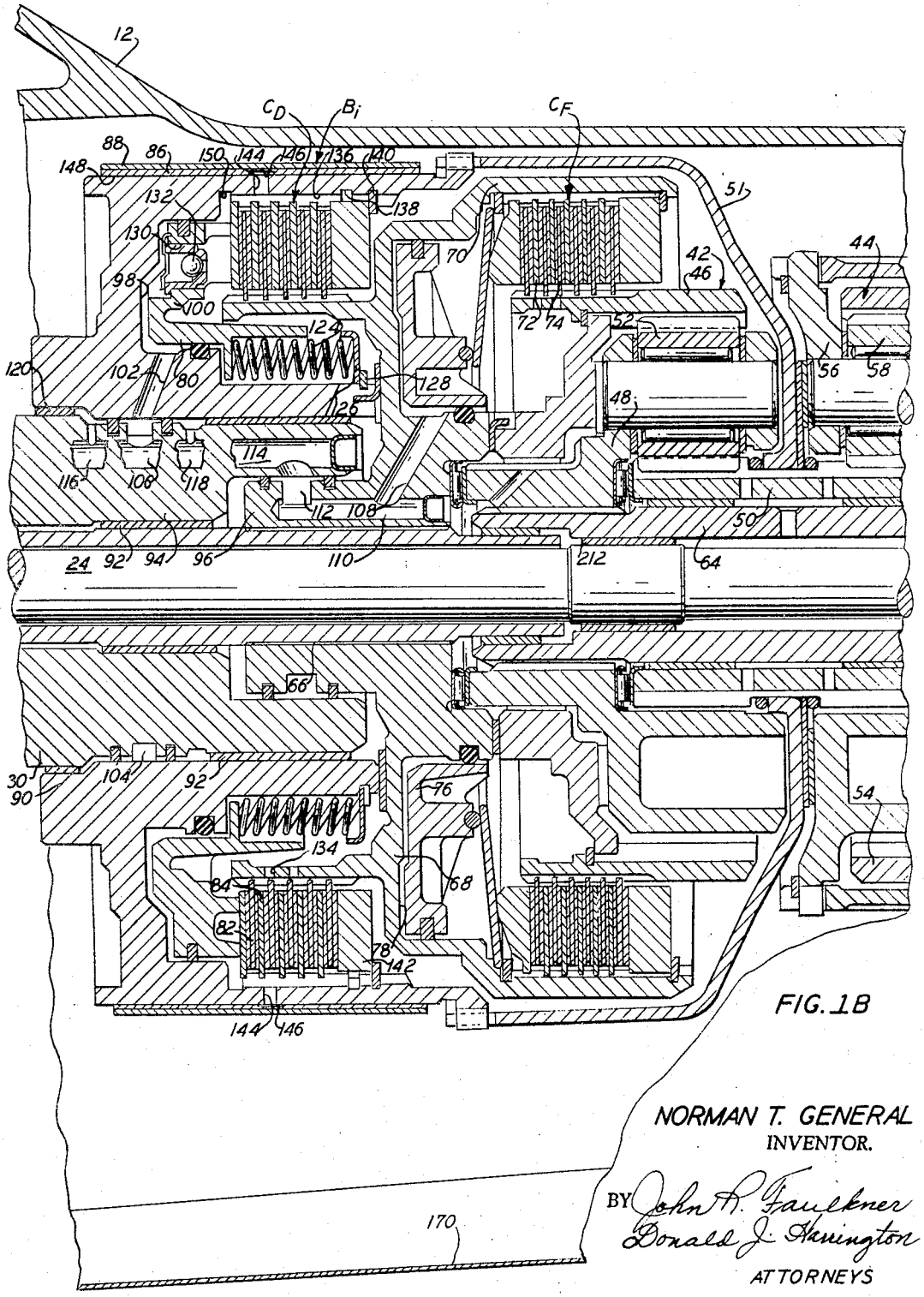
Figure 1C:
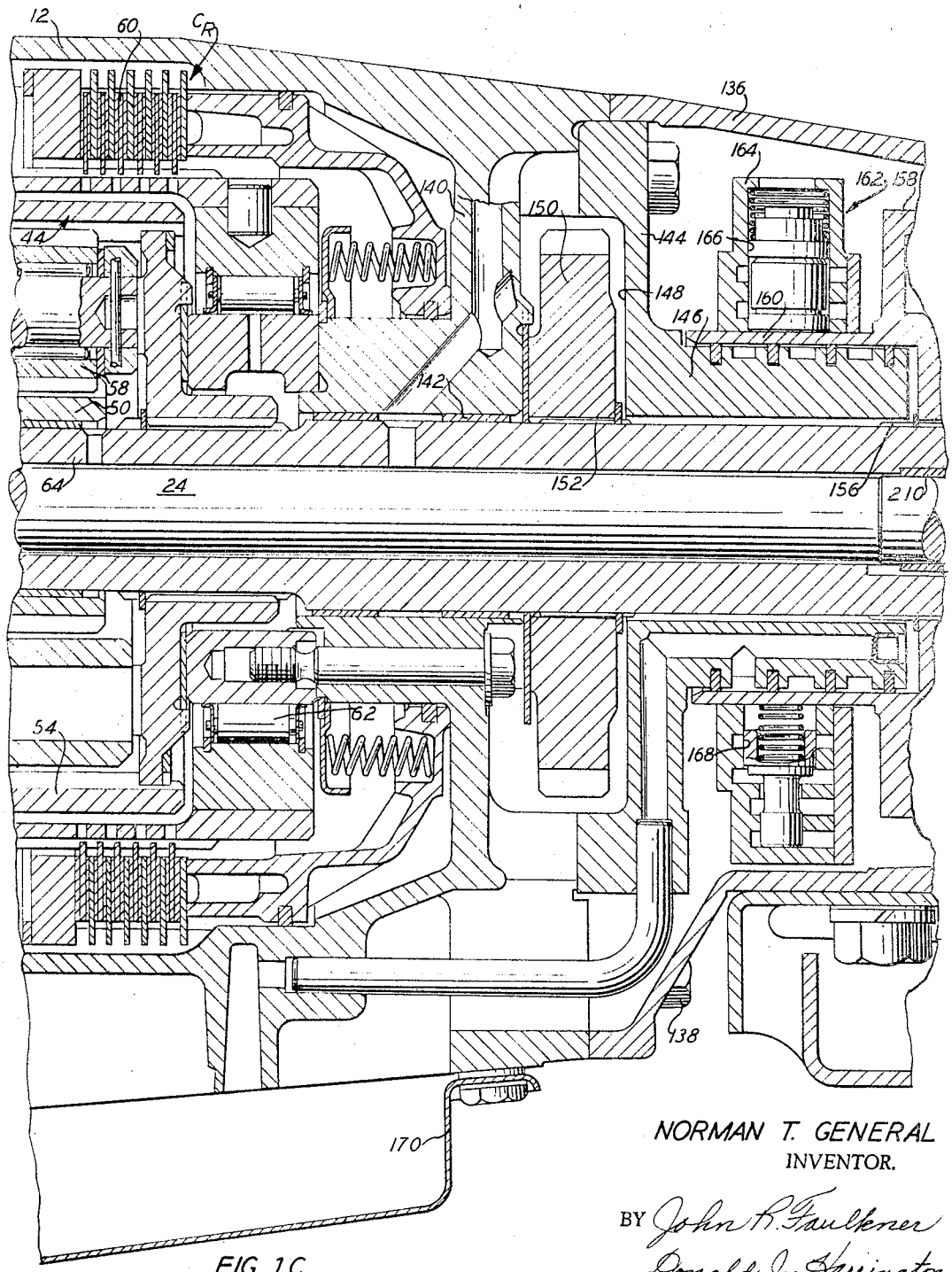
Figure 2:
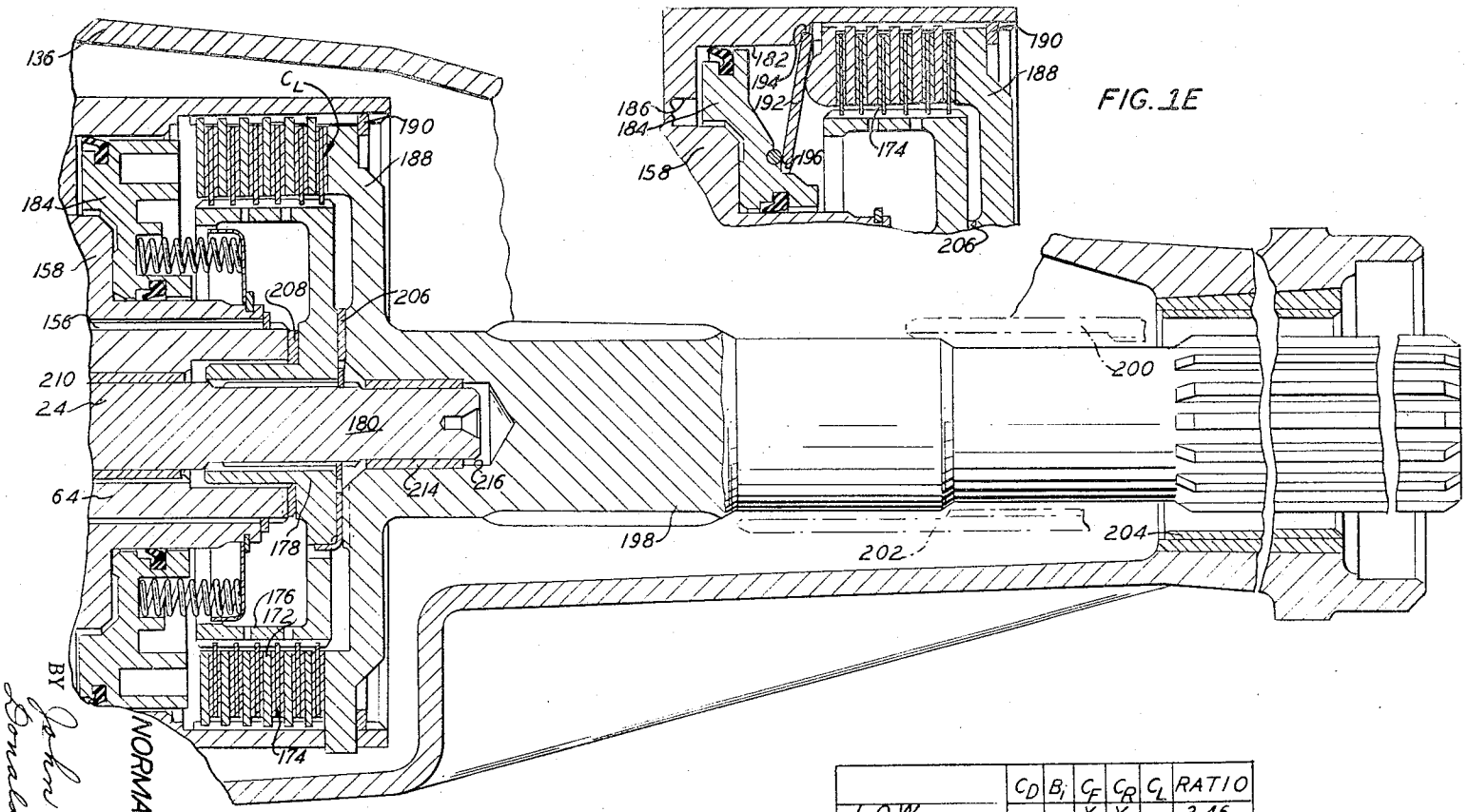
Figure 3:
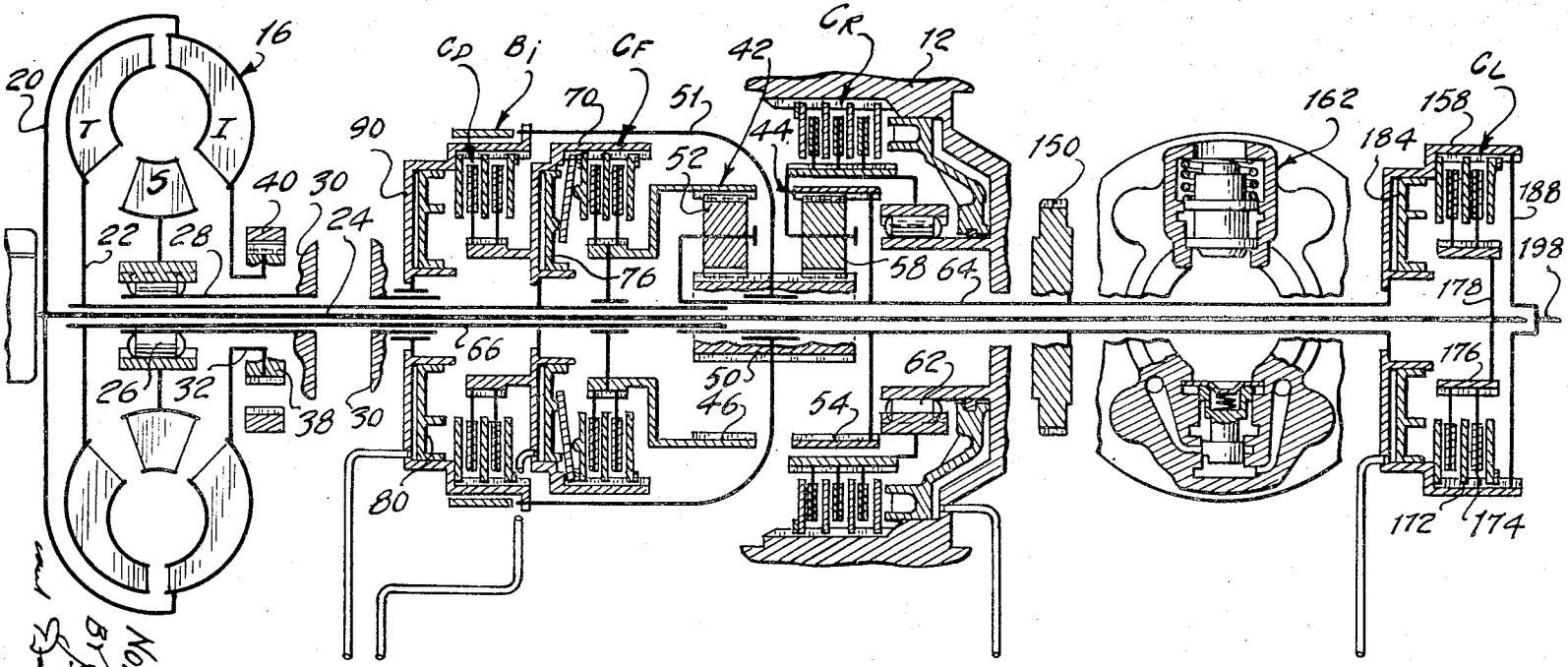

T863004

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JUNE 24, 1969

863 O.G. 1000

761,375

TORQUE CONVERTER TRANSMISSION WITH A BY-PASS CLUTCH

Norman T. General, Farmington, Mich., assignor to Ford Motor Company, Dearborn, Mich., a corporation of Delaware

Continuation of application Ser. No. 606,300, Dec. 30, 1966. This application July 22, 1968. Published June 24, 1969

Int. Cl. F16h *47/08*

U.S. Cl. 74—688

5 Sheets Drawing. 14 Pages Specification

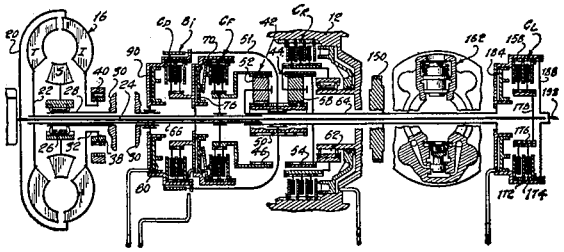

A transmission mechanism having multiple speed ratios, including a direct drive ratio that is achieved by engaging a lock-up clutch in the tailshaft extension housing of the transmission. The clutch is connected to the engine driven impeller of the transmission by a torsion damper shaft.

June 24, 1969 N. T. GENERAL DEF. PUB. T863004

TORQUE CONVERTER TRANSMISSION WITH A BY-PASS CLUTCH SN - 761375

Original Filed Dec. 30, 1966 Sheet 1 of 5

NORMAN T. GENERAL
INVENTOR.

BY John R. Faulkner
Donald J. Harrington
ATTORNEYS

T863004

June 24, 1969 N. T. GENERAL DEF. PUB.

TORQUE CONVERTER TRANSMISSION WITH A BY-PASS CLUTCH SN - 761375

Original Filed Dec. 30, 1966 Sheet 2 of 5

NORMAN T. GENERAL
INVENTOR.

BY John R. Faulkner
Donald J. Harrington
ATTORNEYS

T863009

June 24, 1969 N. T. GENERAL DEF. PUB.

TORQUE CONVERTER TRANSMISSION WITH A BY-PASS CLUTCH SN - 761375

Original Filed Dec. 30, 1966 Sheet 3 of 5

NORMAN T. GENERAL
INVENTOR.

BY John R. Faulkner
Donald J. Harrington
ATTORNEYS

T 863004

June 24, 1969 N. T. GENERAL DEF. PUB.

TORQUE CONVERTER TRANSMISSION WITH A BY-PASS CLUTCH SN - 761375

Original Filed Dec. 30, 1966 Sheet 4 of 5

| | $C_D$ | $B_1$ | $C_F$ | $C_R$ | $C_L$ | RATIO |
|---|---|---|---|---|---|---|
| LOW | | | X | X | | 2.46 |
| INTERMEDIATE | | X | X | | | 1.46 |
| HIGH | X | | X | | | 1.00 |
| LOCK-UP | X | | X | | X | 1.00 SLIP |
| NEUTRAL | | | | | | — |
| REVERSE | X | | | X | | -2.18 |

NORMAN T. GENERAL
INVENTOR.

BY John R. Faulkner
Donald J. Harrington
ATTORNEYS

June 24, 1969 N. T. GENERAL DEF. PUB. T863004

TORQUE CONVERTER TRANSMISSION WITH A BY-PASS CLUTCH SN - 761375

Original Filed Dec. 30, 1966 Sheet 5 of 5

INVENTOR:
NORMAN T. GENERAL
BY John A. Fischer
and Daniel J. Harrington
ATTORNEYS.